(No Model.)
H. J. SMALL & J. McNAUGHTON.
CAR WHEEL LATHE.
No. 330,628. Patented Nov. 17, 1885.
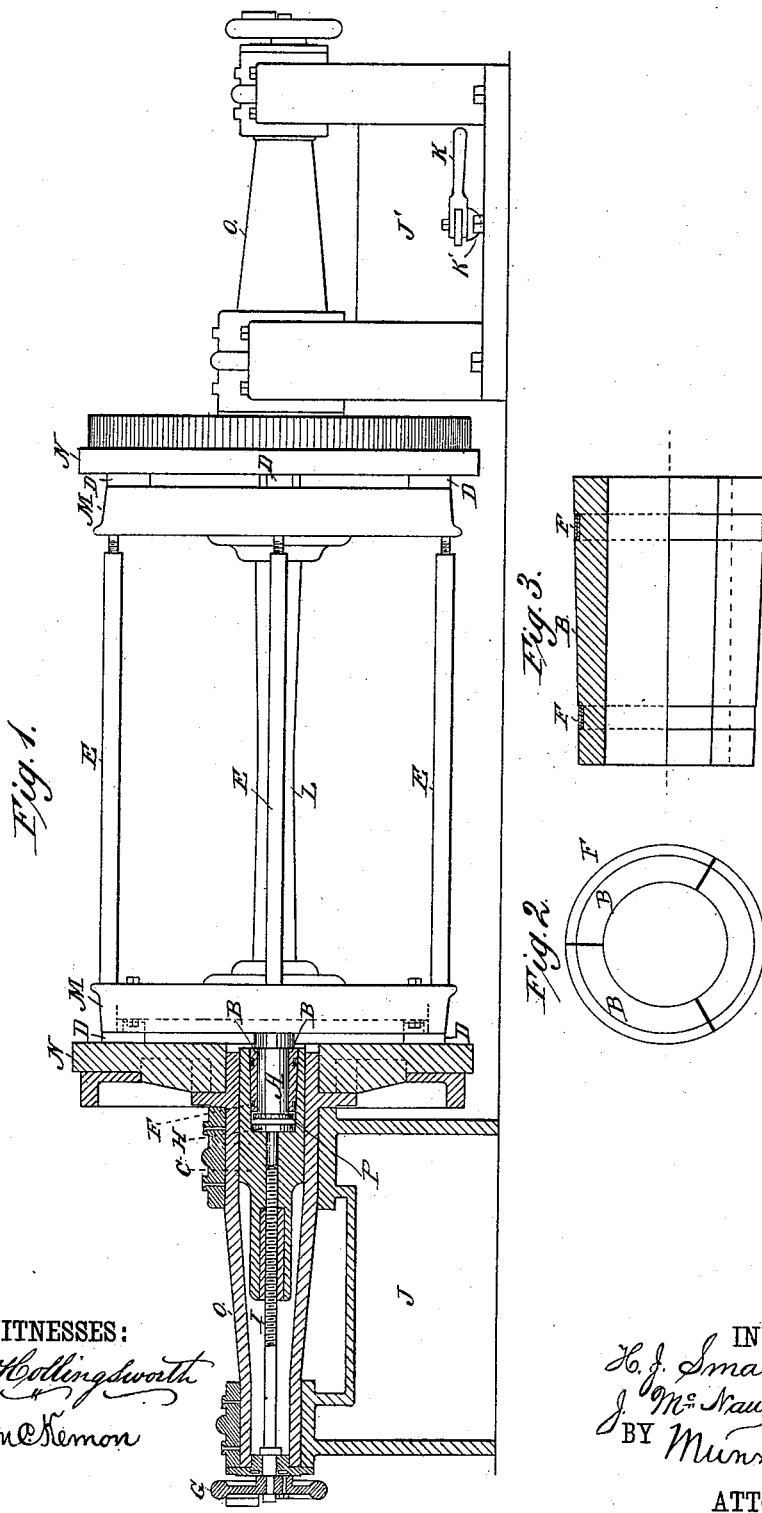
WITNESSES:
W. W. Hollingsworth
Solon C. Kemon
INVENTOR:
H. J. Small
J. McNaughton
BY Munn & Co.
ATTORNEYS.

UNITED STATES PATENT OFFICE.

HENRY J. SMALL AND JAMES McNAUGHTON, OF BRAINERD, MINNESOTA.

CAR-WHEEL LATHE.

SPECIFICATION forming part of Letters Patent No. 330,628, dated November 17, 1885.

Application filed November 7, 1884. Serial No. 147,371. (No model.)

*To all whom it may concern:*

Be it known that we, HENRY J. SMALL and JAMES McNAUGHTON, citizens of the United States, residing at Brainerd, in the county of Crow Wing and State of Minnesota, have invented certain new and useful Improvements in Car-Wheel Lathes, of which the following is a description.

Figure 1 represents a side elevation of our improved car-wheel lathe, showing the fixed head-stock in section through the center. Fig. 2 is an end view of the conical sleeve. Fig. 3 is a side view of the same, partly in section through the center.

Our invention relates to car-wheel lathes; and it consists in the detailed construction and combination of the parts hereinafter fully described, by which the wheels are accurately centered and turned to a perfect circle concentric with the journals of the axles on which they are fixed, and whereby the said wheels are held rigidly in close connection with the face-plates of the lathe and prevented from springing under a heavy cut of the turning-tool.

In the accompanying drawings similar letters of reference indicate corresponding parts in all the figures.

M M are steel-tired car-wheels fixed upon the axle L, which is provided with journals A.

J J' are the fixed and sliding head-stocks, of which the sliding head-stock J' is provided with the ratchet K, connected with the shaft K' of a pinion, which works in a stationary rack, the rack and pinion being common, and not shown, for moving it back and forth, but does not otherwise differ from the fixed head-stock J.

N are the face-plates, provided with dogs D, for securely holding and driving the wheels M.

E are braces. These are placed at intervals between the circumferences of the wheels before the tires are turned, to prevent the axle from springing. Each face-plate is provided with suitable driving-gear and mounted on a hollow spindle, O, which revolves in the head-stock bearings. Each hollow spindle O is centrally bored out at its larger end to receive the center spindle, C, which is provided with a nut engaging with the screw I.

G is a hand-wheel, secured on the end of said screw I so that the center spindle, C, can be moved back and forth in the hollow spindle O. Each center spindle, C, has a central hole, through which the end of screw I works, and a conically-tapering recess, in which is placed the central sleeve, B. The conical sleeve B is formed of three or more sections, as shown in Figs. 2 and 3, which are prevented from falling apart by the spring-rings F, which are slipped into grooves turned on the outer circumference of the said sleeve. The other part of the said outer circumference is turned to a taper corresponding with that of the hole in the center spindle, while the hole in the sleeve is bored straight throughout of a size to receive and fit upon a journal, A, of the car-wheel.

H is a center cap provided with a stem and inserted in the central hole of the center spindle, C.

In turning wheels in our improved lathe the head-stock J' is moved back far enough to admit the axle endwise between the face-plates. The axle-bearings A are inserted in the central parallel holes of the sleeves B, and the head-stock J' moved up again and clamped. When the axle-bearings have collars P, the sections of the sleeves are first placed round the said bearings and held there by the spring-rings F. The sleeves are then inserted in the tapering holes of spindle C, and the head-stock moved up, as before described. The hand-wheels G are then turned so that screws I force the center spindles, C, upon the axle, and thus wedge together the sections of the sleeves B upon the bearings A of the said axle, which is thus accurately centered in the lathe. The dogs D are then moved up so as to attach the wheels M rigidly to the face-plates. The braces E are then placed in position, as shown in Fig. 1, and screwed up, thus relieving the axle of all liability to spring when the turning-tool is taking a heavy cut off the tire. The screw I, being journaled in a bearing at the end of the head-stock, remains in fixed longitudinal relation thereto, while its revolutions force the center spindle, C, to travel longitudinally in the lathe-spindle O. When the screw is turned backward, it withdraws the spindle C, and if the wheels are not at that time fixed to the face-plate or otherwise held the axle will move in with the spindle C, and will not be released from the sleeve B. We therefore place the cap H at the end of the screw to bear against all the segments of the sleeve, in case the axle has no flange to stop the sleeve and the axle while the spindle C withdraws to release them. When the axle is provided with a head or flange, P, the cap H presses against the end of the axle and ejects it by retaining it while the spindle C is withdrawn therefrom.

We do not claim herein, broadly, devices for centering a car-wheel axle in a machine of the class described, but restrict ourselves to the wedge-shaped centerer shown, and covered by the following claims.

Having thus described our invention, what we claim as new, and desire to secure by Letters Patent, is—

1. In a car-wheel lathe, the combination of a conical sleeve made in separate sections and with its central hole straight throughout, with a center spindle having a conically-tapering recess adapted to receive said sleeve and draw together its separate sections, substantially as shown and described, and for the purpose set forth.

2. In a car-wheel lathe, the combination of the conical sleeve B, made in separate sections and with its central hole straight throughout, the center spindle, C, having a conically-tapering recess adapted to receive said sleeve, and the screw I, provided with hand-wheel G, substantially as shown and described, and for the purpose set forth.

3. In a lathe, the combination of a hollow spindle provided with a face-plate, an elastic annular wedge-shaped centering device, a follower, and a hand-wheel for operating said follower, all substantially as described.

HENRY J. SMALL.
JAS. McNAUGHTON.

Witnesses:
ORVILLE H. REYNOLDS,
C. W. WATERMAN.